(12) United States Patent
Snyder et al.

(10) Patent No.: US 11,266,120 B2
(45) Date of Patent: Mar. 8, 2022

(54) SYSTEM AND METHOD FOR AUTOMATED MEDICATION DISPENSING

(71) Applicants: Mark G. Snyder, Port Orange, FL (US); Holly Price, Deland, FL (US)

(72) Inventors: Mark G. Snyder, Port Orange, FL (US); Holly Price, Deland, FL (US)

( * ) Notice: Subject to any disclaimer, the term of this patent is extended or adjusted under 35 U.S.C. 154(b) by 742 days.

(21) Appl. No.: 16/139,592

(22) Filed: Sep. 24, 2018

(65) Prior Publication Data

US 2019/0110434 A1    Apr. 18, 2019

Related U.S. Application Data

(60) Provisional application No. 62/573,457, filed on Oct. 17, 2017.

(51) Int. Cl.
| | | |
|---|---|---|
| *A01K 5/02* | (2006.01) | |
| *A01K 7/02* | (2006.01) | |
| *G07F 17/00* | (2006.01) | |
| *A61J 7/04* | (2006.01) | |
| *G07F 9/02* | (2006.01) | |
| *G07F 11/62* | (2006.01) | |

(52) U.S. Cl.
CPC .............. *A01K 5/0275* (2013.01); *A01K 7/02* (2013.01); *A61J 7/0481* (2013.01); *G07F 9/026* (2013.01); *G07F 11/62* (2013.01); *G07F 17/0092* (2013.01); *A61J 2205/60* (2013.01)

(58) Field of Classification Search
CPC .......... A01K 5/02; A01K 5/0275; A01K 7/04; A01K 7/0409; A01K 7/0418; A01K 7/0427; A01K 7/0436; A01K 7/0445; A01K 7/0472; A01K 7/0481; A61J 7/0076; A61J 2200/70; A61J 2205/60
USPC .......................................... 119/51.01, 51.02
See application file for complete search history.

(56) References Cited

U.S. PATENT DOCUMENTS

2016/0220180 A1*  8/2016  Fateh .................... A61B 5/4833
2016/0239635 A1*  8/2016  Fateh .................... A61F 9/0008

* cited by examiner

*Primary Examiner* — David J Parsley
*Assistant Examiner* — Danielle A Clerkley
(74) *Attorney, Agent, or Firm* — Allen, Dyer, Doppelt & Gilchrist, P.A.

(57) ABSTRACT

An automated medication dispensing system includes a lightning sensor configured to detect an electromagnetic signature of a lightning strike and a dispenser bank configured to store and dispense a medication for a pet. A user interface is configured to input one or more dispensing parameters for dispensing the medication stored in the dispenser bank. A microcontroller is in signal communication with the lightning sensor, the dispenser bank, and the user interface. The microcontroller is configured to generate a dispensing signal for opening the dispenser bank based on data received from the lightning sensor and the user interface. The dispenser bank is configured to dispense the medication once receives the dispensing signal from the microcontroller.

20 Claims, 4 Drawing Sheets

SYSTEM AND METHOD FOR AUTOMATED MEDICATION DISPENSING

CROSS-REFERENCE TO RELATED APPLICATION

This application claims the benefit of U.S. Provisional Patent Application Ser. No. 62/573,457, filed on Oct. 17, 2017, the contents of which are herein incorporated by reference in their entirety.

FIELD OF THE INVENTION

The present invention relates to an automated system, and more particularly, to an automated medication dispensing system for pets.

BACKGROUND OF THE INVENTION

An estimated one-half of the roughly 80 million canines alive in the United States today suffer from thunderstorm-related anxiety or separation anxiety. Related behaviors range from panting and mild agitation to destructiveness. In one documented case a dog jumped through a plate glass window in a thunderstorm. Various treatments have been proposed.

Common treatment approaches include behavior modification and immersion therapy. Such methods are potentially useful for minor cases of thunderstorm anxiety or separation anxiety. Extreme cases may warrant sedation. Pet owners themselves often compound difficulties by working full-time jobs, limiting their availability to comfort a pet at home in a thunderstorm. Many owners have returned home from work to find holes chewed through doors and other evidence of destructive behavior. In extreme cases of anxiety, a pet can sustain a fatal injury. Further improvements are possible to provide automatic medicine dispensing thunderstorm-related anxiety or other types of separation anxieties.

SUMMARY OF THE INVENTION

In view of the foregoing, it is an object of the present invention to provide an automated medication dispensing system for pets. According to one embodiment of the present invention, an automated medication-dispensing system includes a lightning sensor configured to detect an electromagnetic signature of a lightning strike and a dispenser bank configured to store and dispense a medication for a pet. A user interface is configured to input one or more dispensing parameters for dispensing the medication stored in the dispenser bank. A microcontroller is in signal communication with the lightning sensor, the dispenser bank, and the user interface. The microcontroller is configured to generate a dispensing signal for opening the dispenser bank based on data received from the lightning sensor and the user interface. The dispenser bank is configured to dispense the medication on receiving a dispensing signal from the microcontroller.

A method of automated dispensing of medication to a pet in response to the detection of lightning in the atmosphere includes inputting one or more dispensing parameters for dispensing a medication stored in a dispenser bank, and detecting an electromagnetic signature of a lightning strike via a lightning sensor. A dispensing signal is generated, via a microcontroller, for opening the dispenser bank based on a signal received from the lightning sensor and the user interface. The medication stored in the dispenser bank is dispensed on receiving the dispensing signal from the microcontroller.

These and other objects, aspects and advantages of the present invention will be better appreciated in view of the drawings and following detailed description of preferred embodiments.

DETAILED DESCRIPTION OF PREFERRED EMBODIMENTS

Figure 1:
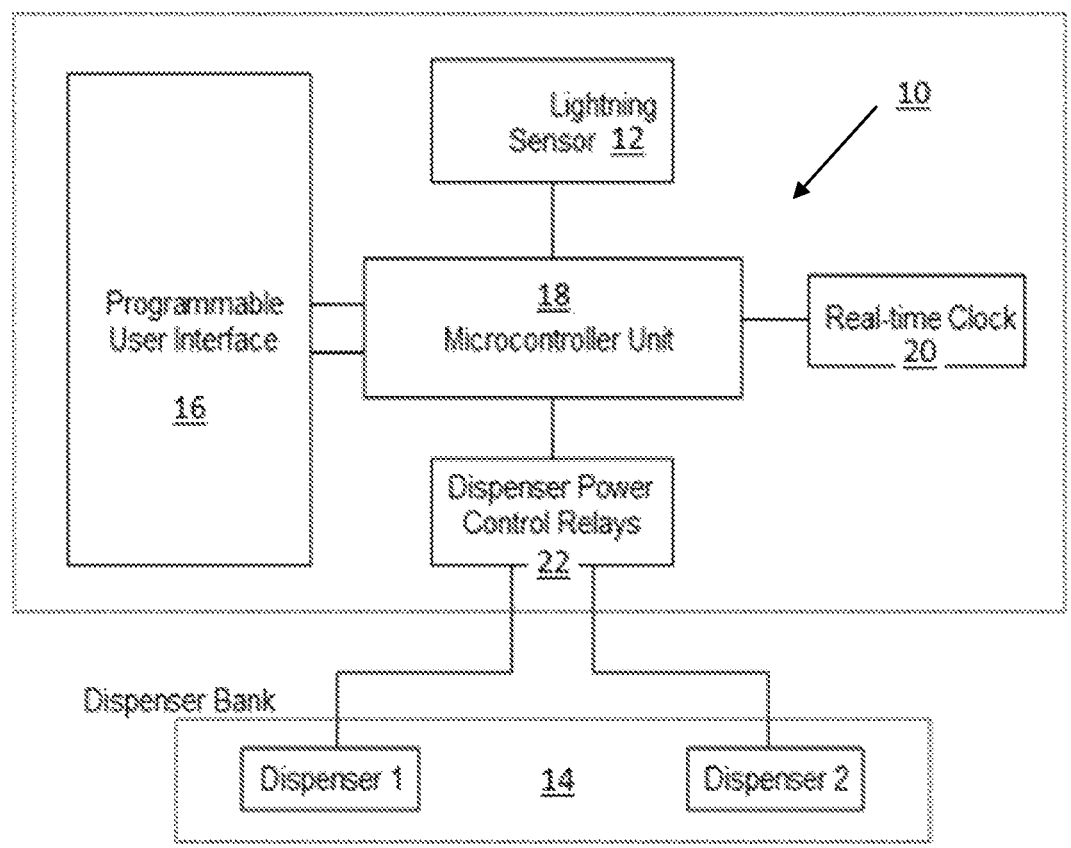
FIG. 1 is a block diagram of the automatic medication dispensing system.

Referring to FIG. 1, an automated medication dispensing system 10 for dispensing medication to a pet on detecting lightning in the atmosphere includes a lightning sensor 12, a dispenser bank 14, a user interface 16, and a microcontroller 18.

The lightning sensor 12 is configured to detect an electromagnetic signature of a lightning strike. The lightning sensor 12 can detect the electromagnetic signatures of cloud-to-ground and cloud-to-cloud lightning strikes. For example, the lightning sensor 12 can calculate the direction and severity of lightning by radio direction finding techniques along with an analysis of the characteristic frequencies emitted by a lightning strike and estimate distance by signal frequency and attenuation. The lightning sensor 12 employs spectral analysis to distinguish man-made disturbances from lightning strikes. This greatly reduces the occurrence of false lightning strike detection. The sensitivity of the lightning sensor 12 is adjustable. For example, the lightning sensor 12 can be set to detect a lightning strike up to certain distance away (e.g., 25 miles). The lightning sensor 12 can also be set to determine changes in the relative location of the detected thunderstorm, for example, whether a storm is moving toward, away from, or parallel to the lightning sensor 12. This increases the ability of the system 10 to detect whether a thunderstorm at the location of the system 10 is imminent.

The dispenser bank 14 is configured to store and dispense a medication for a pet. As an example, the dispenser bank includes two solenoid-controlled, trap-door style dispensing units, shown as dispenser 1 and dispenser 2. Each dispenser can be loaded with a medication or treat containing a sedating medication prescribed by a veterinarian. When receiving a dispensing command from the microcontroller 18, a trap door of a first dispenser opens, delivering a first does of medication to a pet. After a certain specific time, a trap door of a second dispenser opens, delivering a second dose of medication to the pet. This design of the dispensing scheme forestalls accidental overdosing.

The user interface 16 is configured to input one or more dispensing parameters related to dispensing the medication stored in the dispenser bank. The user interface 16 can enable a user to input the prescribed dispensing frequency. For example, a user can input a time interval between the dispensing of a first dose and a second dose of medication and/or a time interval between detection of a lightning strike and the dispensing of a first dose of medication.

The microcontroller 18 is in signal communication with the lightning sensor 12, the dispenser bank 14, and the user interface 16. The microcontroller 18 is configured to generate a dispensing signal for opening the dispenser bank 14 based on data received from the lightning sensor 12 and the user interface 14. The dispensing signal takes into an account of a time between the detected lightning strike and an approaching thunderstorm. The dispenser bank 14 is configured to dispense the medication on receiving a dispensing signal from the microcontroller 18.

As an example, the microcontroller 18 can include a 32-bit microcomputer chip that forms the core of the controller's processing and dispenser-command architecture. The microcontroller 18 can be configured to receive and process data gathered by the lightning sensor 12 and coordinate the functions selected by a user through the user interface 14. All user-defined settings are retained by the microcontroller unit 18 in non-volatile memory even under power failure. Therefore, once user-defined parameters are programmed into the system microcontroller 18, no further configuration is required. In certain electrically-noisy environments, such as close proximity to high-tension power transmission lines, the sensitivity can be adjusted via the microcontroller 18 to reject disturbances and limit false positives.

The system 10 can further include a real-time clock (RTC) 20 in signal communication with the microcontroller 18. The RTC 20 can be integrated into the microcontroller 18 or be a separate piece. The RTC 20 includes an integrated circuit chip that includes a time-keeping system. For example, the RTC will store a timestamp in the non-volatile memory of the microcontroller 18 at the instant the first dispenser (dispenser 1) is deployed. By logging this time, the microcontroller 18 will prevent the second dispenser (dispenser 2) from deploying its medication until a specific time interval (lockout time) has elapsed. The time interval will allow the first dose of medication to wear off before the second dose is dispensed. The RTC 20 can be important in the event of a power failure. For example, if a first load of medication is dispensed and power is lost during a storm, the microcontroller 18 will have stored the first dispenser's deployment time in its non-volatile memory. When power is restored, the microcontroller 18 can reconfigure itself and execute the remainder of the lockout time, if necessary. The system 10 can further include a backup battery to power the system during the time of power loss.

The system 10 uses a standard 12 V DC power supply that can plugs into any standard 115-V wall socket. The system 10 can also include dispenser power control relays 22. The relays 22 can be configured to deliver power to operate the microcontroller 18 and the dispenser 16. As an example, heavy duty relays, such as 10 amp full load relays, can be useful for the application.

Figure 2:
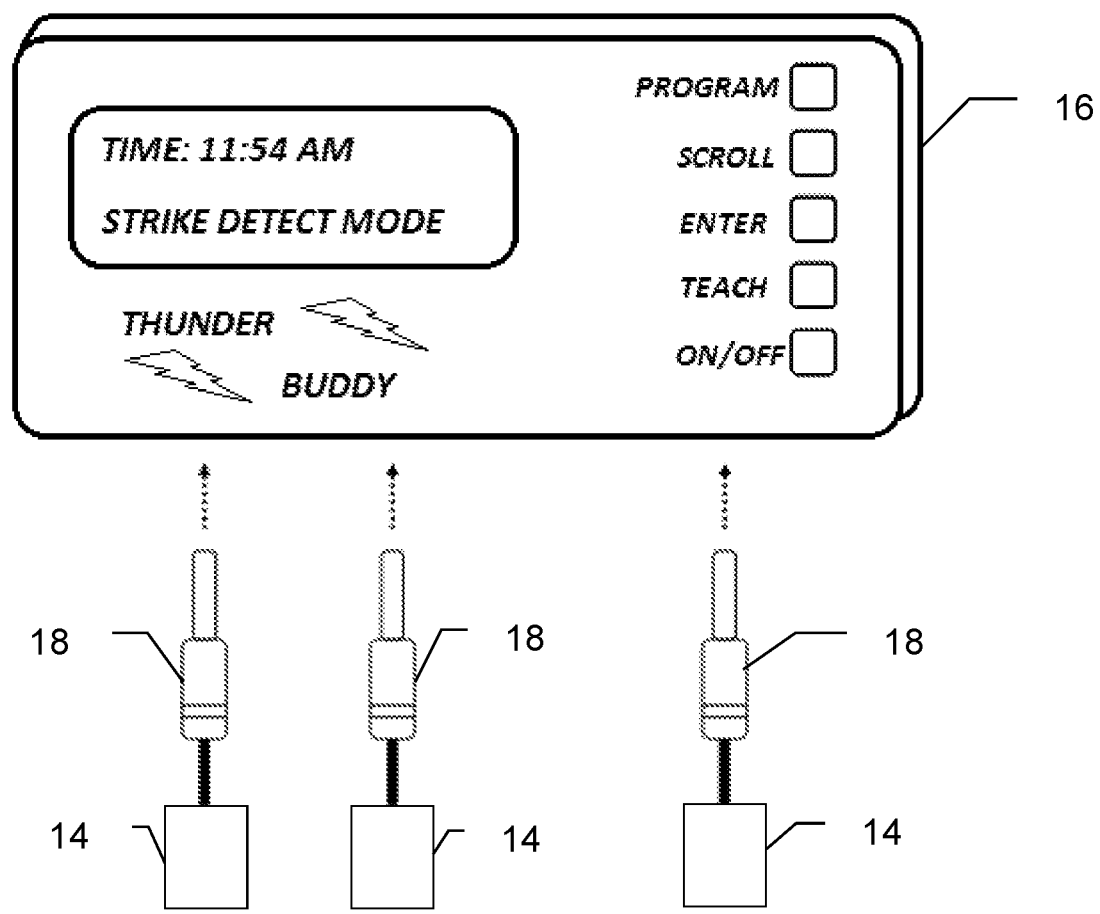
FIG. 2 is an example user interface and controls of the automated medication dispensing system of FIG. 1.

Referring to FIG. 2, an example user interface 16 can be programmed to enter a distance threshold, i.e., activation of medication dispensing based on a detected distance. For example, the lightning sensor 12 can be set to detect a lightning strike up to 25 miles away, for example, at a distance of 25, 19, 17, 15, 13, 11, 12, 8, 5 or 3 miles. The distance threshold can account for the time the animal will need to ingest the medication and for the medication to take effect.

The user interface 16 can also be used to time set a lockout time. When a lightning strike is detected within the set distance threshold setting, the system 10 (e.g., the lightning sensor 12 or microcontroller 18) can initiate an audible sound to gain a pet's attention and dispense medication by the first dispenser (dispenser 1). The system can then enter a lockout time phase. This can prevent the second dispenser (dispenser 2) dispensing medication in the event of an additional strike detection, preventing overmedicating the animal. When the time lockout expires, the system 10 can return to normal operation and dispense the contents of dispenser 2, in case a further lightning strike is detected. This feature enables medication dispensing more than once per day, if needed, and avoids over-sedation.

The user interface 16 can also include a manual dispensing "teach" button, allowing a user to operate the dispenser manually. This button can allow a user to train his pet to recognize that an edible treat is coming from a dispenser. As an example, when the "teach" button is pushed, a soft audible sound can be generated prior to dispenser deployment to gain a pet's attention. The pet will learn that hearing the sound and seeing the dispenser open signal a tasty treat is coming.

The user interface 16 can also display a current time set by the user and strike-related data detected by the lightning sensor 12. For instance, if a user has the distance threshold set for 12 miles, strikes outside that range will not initiate dispenser deployment but will be displayed on the monitor to indicate the possibility of an approaching thunderstorm.

The system 10 can be fully automated and made to dispense medication only as programmed over a 14-hour period (a full workday). The system 10 can also include additional dispensers and is programmed over a multi-day period. Programming the system 10 is simple and intuitive. When the "Program" button of the user interface 16 is pressed, a series of selections can be made using the "Scroll" button. A user, on reaching a desired setting, presses the "enter" button, advancing the user interface to the next menu. Programming mode is exited automatically once all selections are made.

Figure 3:
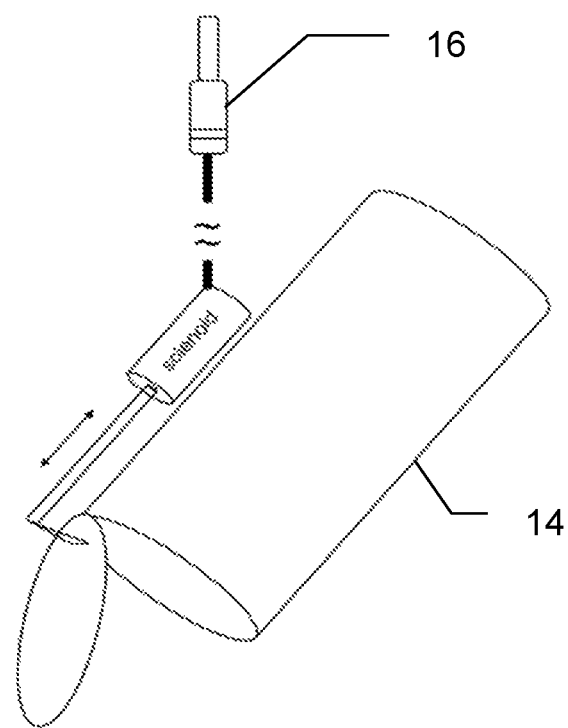
FIG. 3 is a perspective view of an example automatic medication dispensing system, according to an embodiment of the present invention.

Referring to FIG. 3, the system 10 can be contained within an injection molded plastic housing which can be attach to a wall in a convenient location. The system 10 can be compact and hidden from view.

Figure 4:
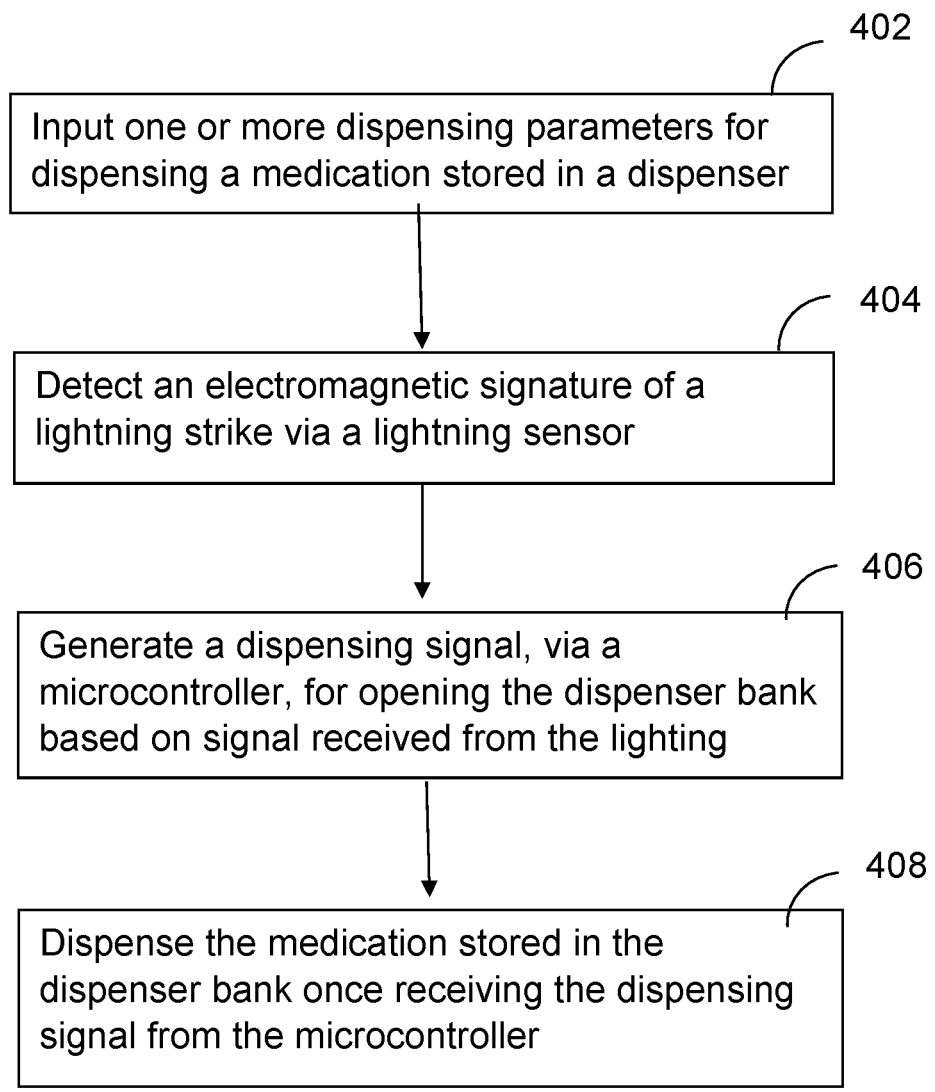
FIG. 4 is a flowchart illustrating an exemplary method of automated medication dispensing.

Referring to FIG. 4, a method of automated dispensing of medication to a pet in the presence of lightning activity in the atmosphere includes, at step 402, inputting one or more dispensing parameters for dispensing a medication stored in a dispenser bank. As an example, a user can use the user interface 16 to input one or more dispensing parameters related to medication dispensing. The one or more dispensing parameters include a "distance threshold" to define a distance from a lightning strike for dispensing medication. As another example, the one or more dispensing parameters also includes a "lockout time" to ensure a minimum time interval between two dispensing actions.

At step 404, an electromagnetic signature of a lightning strike is detected by a lightning sensor. When the system 10 is turned on, the system is in "Strike Detect Mode," and the lightning sensor 12 is activated by electromagnetic disturbances released by a lightning strike. The lightning sensor 12 can detect the electromagnetic signature of cloud-to-ground and cloud-to-cloud lightning strikes. For example, the lightning sensor 12 can determine the distance and severity of lightning using frequency domain spectral analysis techniques to process and compute data from the detected electromagnetic signature generated by the strike.

At step 406, a dispensing signal for opening the dispenser bank is generated based on data received from the lightning sensor and the user interface via a microcontroller. The dispensing signal comprises an audio signal to inform a pet that a treat is coming and an electronic signal to open the door of a dispenser (e.g., dispenser 1).

At step 408, the medication stored in the dispenser bank 14 is dispensed on receiving the dispensing signal from the microcontroller. As an example, the dispenser bank 14 includes a solenoid-controlled trap-door. The dispensing signal can be a current control signal used to actuate the door from a closed position to an open position. The dispenser can have an inclined surface such that once the door is opened, the medication stored inside will be dispensed via gravity.

When the dispenser bank 14 has two dispensing units, the medication can be released to a pet from a first dispenser (dispenser 1) and, after a predefined time, from a second dispenser (dispenser 2). Specifically, after the first dispensing, the device system will enter a user-defined lockout period to prevent a second dispensing within the lockout period. Once the lockout period had expired, the system can return to a normal "Strike Detect Mode," and medication will be dispensed if a lightning strike meets the preset detection criteria. The lockout period is determined by the type of medication prescribed and the frequency of dosing specified by the veterinarian.

In the event of a power failure, the system 10 can have a real time clock to record the time when the contents of a dispenser (e.g., a first dispenser) was released and calculate any remaining lockout time when power is regained. If a second approaching electrical storm is detected, the second dispenser will release its medicated treat, but only if the lockout time has expired. When all medication has been dispensed, the device will instruct a user to reset the system.

The system 10 described herein is a unique and highly useful solution for working people with pets that suffer from thunderstorm and/or separation anxiety. The system 10 automates control over the supply of multiple doses of medication. The system 10 can provide sedating medication to a pet as necessary and without the possibility of overdose. The system 10 is highly effective in detecting distant thunderstorms and deploying sedating medication, which can significantly reduce the destructive behavior displayed by some pets that exhibit separation and thunderstorm-related anxiety.

In addition to thunder anxiety, the system 10 can also be used in separation anxiety. A user (a pet owner) can program the system 10 for automatic dispensing of veterinarian-prescribed drugs while the owner is away from his domicile, ensuring the pet always receives the proper medication on time and averting destructive and potentially deadly behavior.

The foregoing is provided for illustrative and exemplary purposes; the present invention is not necessarily limited thereto. Rather, those skilled in the art will appreciate that various modifications, as well as adaptations to particular circumstances, are possible within the scope of the invention as herein shown and described.

What is claimed is:

1. An automated medication dispensing system comprising:
   a lightning sensor configured to detect an electromagnetic signature of a lightning strike;
   a dispenser bank configured to store and dispense a medication for a pet;
   a user interface configured to input one or more dispensing parameters for dispensing the medication stored in the dispenser bank;
   a microcontroller in signal communication with the lightning sensor, the dispenser bank, and the user interface, the microcontroller being configured to generate a dispensing signal for opening the dispenser bank based on data received from the lightning sensor and the user interface; and
   wherein the dispenser bank is configured to dispense the medication once the dispensing signal is received from the microcontroller.

2. The automated medication dispensing system of claim 1, wherein the lightning sensor is configured to analyze a spectrum of the detected electromagnetic signature.

3. The automated medication dispensing system of claim 1, wherein the lightning sensor is configured to generate an audio sound when a specific electromagnetic signature is detected.

4. The automated medication dispensing system of claim 1, wherein the lightning sensor is configured to determine a direction of the lightning strike relative to the lightning sensor.

5. The automated medication dispensing system of claim 1, wherein the lightning sensor is configured to detect a lightning strike within a specified distance.

6. The automated medication dispensing system of claim 1, wherein the dispensing signal includes an audible sound.

7. The automated medication dispensing system of claim 1, wherein the dispenser bank includes a first dispenser and a second dispenser.

8. The automated medication dispensing system of claim 7, wherein the user interface is configured to input a lockout time between medication dispensing of a first dose via the first dispenser and a second dose via the second dispenser.

9. The automated medication dispensing system of claim 8, wherein the lockout time is determined by dose frequency of the medication.

10. The automated medication dispensing system of claim 1, wherein the dispenser bank is opened via a solenoid activating mechanism.

11. The automated medication dispensing system of claim 1, wherein the user interface is configured to input a time interval between a lightning strike detection and dispensing of a dose.

12. The automated medication dispensing system of claim 1, wherein the system further includes a real-time clock, wherein the clock is configured to store a timestamp in the microcontroller at the instant a first load of medication is dispensed.

13. The automated medication dispensing system of claim 1, wherein a power control relay is connected between the microcontroller and the dispenser bank to operate the dispenser bank based on the dispensing signal received from the microcontroller.

14. The automated medication dispensing system of claim 1, wherein user interface includes a manual deploy button to manually dispense medication stored in the dispenser bank.

15. The automated medication dispensing system of claim 1, wherein the user interface is configured to display strike-related data detected by the lightning sensor.

16. The automated medication dispensing system of claim 1, wherein the system is contained within a plastic housing attachable to a wall.

17. A method of automated dispensing of medication to a pet during presence of lightning activity in the atmosphere, the method comprising:
   receiving from a user interface one or more dispensing parameters for dispensing a medication stored in a dispenser bank;
   detecting an electromagnetic signature of a lightning strike via a lightning sensor;

generating a dispensing signal, via a microcontroller, for opening the dispenser bank based on a signal received from the lightning sensor and the user interface; and operating the dispenser bank to dispense the medication stored therein once the dispensing signal is received from the microcontroller.

18. The method of claim 17, wherein the dispenser bank includes a first dispenser and a second dispenser, and the method further comprising receiving, from the user interface, a time interval between medication dispensing of a first dose via the first dispenser and a second dose via the second dispenser.

19. The method of claim 17, wherein dispensing the medication includes opening a door of the dispenser bank via a solenoid activating mechanism.

20. The method of claim 17, wherein the one or more dispensing parameters includes a time interval between a lightning strike detection and the dispensing of the medication.

* * * * *